US008611178B2

(12) United States Patent
Deivasigamani

(10) Patent No.: US 8,611,178 B2
(45) Date of Patent: Dec. 17, 2013

(54) DEVICE AND METHOD TO PERFORM MEMORY OPERATIONS AT A CLOCK DOMAIN CROSSING

(75) Inventor: Vinoth Kumar Deivasigamani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/294,944

(22) Filed: Nov. 11, 2011

(65) Prior Publication Data

US 2013/0121100 A1    May 16, 2013

(51) Int. Cl.
*G11C 8/16* (2006.01)

(52) U.S. Cl.
USPC .............. 365/233.13; 365/233.1; 365/233.11; 365/233.12; 365/233.5; 365/189.04

(58) Field of Classification Search
USPC ............... 365/233.13, 233.1, 233.11, 233.12, 365/233.5, 189.04; 711/167; 713/400
See application file for complete search history.

(56) References Cited

U.S. PATENT DOCUMENTS

| | | | | |
|---|---|---|---|---|
| 5,555,524 A * | 9/1996 | Castellano | ................... | 365/221 |
| 5,884,100 A * | 3/1999 | Normoyle et al. | .............. | 710/52 |
| 6,337,832 B1 | 1/2002 | Ooishi et al. | | |
| 6,510,095 B1 | 1/2003 | Matsuzaki et al. | | |
| 6,718,449 B2 * | 4/2004 | Phi | ............................... | 711/167 |
| 6,738,295 B2 * | 5/2004 | Kim | ........................ | 365/189.05 |
| 7,107,393 B1 * | 9/2006 | Sabih | ............................ | 711/109 |
| 7,185,216 B1 * | 2/2007 | Bhandari et al. | .............. | 713/400 |
| 7,239,574 B2 * | 7/2007 | Koji | ................................ | 365/194 |
| 7,310,396 B1 * | 12/2007 | Sabih | ............................ | 375/354 |
| 7,333,516 B1 | 2/2008 | Sikkink et al. | | |
| 7,477,712 B2 * | 1/2009 | Fischer et al. | ................ | 375/359 |
| 7,661,010 B2 * | 2/2010 | DeFazio et al. | ............... | 713/500 |
| 7,689,856 B2 | 3/2010 | Godiwala | | |
| 7,720,107 B2 * | 5/2010 | Bhattacharya et al. | ........ | 370/503 |
| 7,925,803 B2 * | 4/2011 | Mangano et al. | ............... | 710/52 |
| 7,953,998 B2 * | 5/2011 | Kang | ............................ | 713/500 |
| 7,996,468 B2 * | 8/2011 | Cheah | .......................... | 709/204 |
| 8,089,378 B1 * | 1/2012 | Stoler et al. | ...................... | 341/61 |

(Continued)

OTHER PUBLICATIONS

Williams, Wade L. et al. "Low Latency Clock Domain Transfer for Simultaneously Mesochronous, Plesiochronous and Heterochronous Interfaces," 13th IEEE International Symposium on Asynchronous Circuits and Systems, 2007, 9 pages.

(Continued)

*Primary Examiner* — Viet Q Nguyen
(74) *Attorney, Agent, or Firm* — Sam Talpalatsky; Nicholas J. Pauley; Joseph Agusta

(57) ABSTRACT

A device and method to perform memory operations at a clock domain crossing is disclosed. In a particular embodiment, a method includes providing a first clock signal to a write clock input of a memory to write data to the memory. The data is read from the memory according to a second clock signal that is different from the first clock signal. A third clock signal is provided to a read clock input of the memory. The third clock signal has a frequency that is substantially an integer multiple of a frequency of the second clock signal. The integer multiple is greater than one.

27 Claims, 7 Drawing Sheets

(56) References Cited

U.S. PATENT DOCUMENTS

| | | | |
|---|---|---|---|
| 8,260,982 B2* | 9/2012 | Paulson et al. | 710/33 |
| 8,295,120 B2* | 10/2012 | Choi | 365/233.1 |
| 8,301,932 B2* | 10/2012 | Hay et al. | 713/400 |
| 2004/0218425 A1 | 11/2004 | Fukushima | |
| 2005/0033910 A1 | 2/2005 | Sommer | |
| 2006/0277329 A1* | 12/2006 | Paulson et al. | 710/39 |
| 2009/0180335 A1* | 7/2009 | Chokkalingam et al. | 365/189.05 |

OTHER PUBLICATIONS

Cummings, Clifford E. "Simulation and Synthesis Techniques for Asynchronous FIFO Design," Sunburst Design, Synopsys Users Group (SNUG) San Jose 2002, Revision 1.2, http://citeseerx.ist.psu.edu/viewdoc/download?doi=10.1.1.151.2009&rep=rep1&type=pdf, 23 pages.

International Search Report and Written Opinion—PCT/US2012/064728—ISA/EPO—Apr. 22, 2013.

* cited by examiner

DEVICE AND METHOD TO PERFORM MEMORY OPERATIONS AT A CLOCK DOMAIN CROSSING

I. FIELD

The present disclosure is generally related to memory operations, and more particularly to memory operations at a clock domain crossing.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless telephones and other electronic devices may utilize multiple clock signals associated with different device components. For example, electronic devices may include a clock domain crossing that divides clock domains associated with different electronic components. Also, a single electronic device may also include multiple clocks and one or more clock domain crossings, further increasing device complexity. Data may be transmitted over a clock domain crossing by writing the data to a memory using a clock from a source clock domain and reading the data from the memory using a clock from a destination clock domain. However, transmitting the data over the clock domain crossing may require multiple clock cycles before the data is available at the destination clock domain, causing delays (and reduced performance).

III. SUMMARY

A write pointer of a memory, such as an asynchronous first-in first-out (FIFO) buffer, is synchronized according to a higher-frequency clock signal than a clock signal used to read data from the memory. The higher-frequency clock signal has a frequency that is an integer multiple of a frequency of the clock signal used to read from the memory. The integer multiple is greater than one. For example, the integer multiple may be two, four, or eight. Because cycles of the higher-frequency clock signal are shorter than cycles of the clock signal used to read the data, a read latency associated with synchronizing the write pointer to the higher-frequency clock signal is reduced as compared to synchronizing the write pointer to the lower-frequency clock signal. Applications such as a double data rate (DDR) interface or a serializer/deserializer (SerDes) interface may use such a higher-frequency clock to support data transfer. For example, a serializer may have one clock for parallel data and a higher-frequency clock for serial data. Such a higher-frequency clock signal of the DDR interface or the SerDes interface may be used to synchronize the write pointer of the memory.

In a particular embodiment, a method includes providing a first clock signal to a write clock input of a memory to write data to the memory. The data is read from the memory according to a second clock signal that is different from the first clock signal. A third clock signal is provided to a read clock input of the memory. The third clock signal has a frequency that is substantially an integer multiple of a frequency of the second clock signal. The integer multiple is greater than one.

In another particular embodiment, a memory includes a write clock input responsive to a first clock signal and a data output configured to output data according to a second clock signal that is different from the first clock signal. The memory further includes a read clock input responsive to a third clock signal. The third clock signal has a frequency that is substantially an integer multiple of a frequency of the second clock signal, where the integer multiple is greater than one.

In another particular embodiment, an apparatus is disclosed. The apparatus includes means for storing a write pointer value that indicates a storage location of a memory. The apparatus further includes means for synchronizing the write pointer value based on a first signal. The first signal has a frequency that is substantially an integer multiple of a frequency of a second signal, where the data is read from the memory according to the frequency of the second signal. The integer multiple is greater than one.

One particular advantage provided by at least one of the disclosed embodiments is reduced latency associated with reading data from a memory (i.e., a "read latency"). For example, according to an embodiment, a frequency of a third clock signal used to synchronize a write pointer is greater than a frequency of a second clock used to read the data from the memory. As a result, the write pointer may be synchronized more quickly as compared to synchronizing the write pointer based on the clock signal used to read the data. According to another embodiment, a higher-rate clock is applied to a write clock input of the memory to increase a speed of synchronizing a read pointer of the memory. Because synchronization of the read pointer may occur more quickly by applying the high-rate clock to the write clock input, a "full" indicator signal may be asserted less often or less "pessimistically," increasing throughput (e.g., rate of data transfer) associated with the memory.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 1:
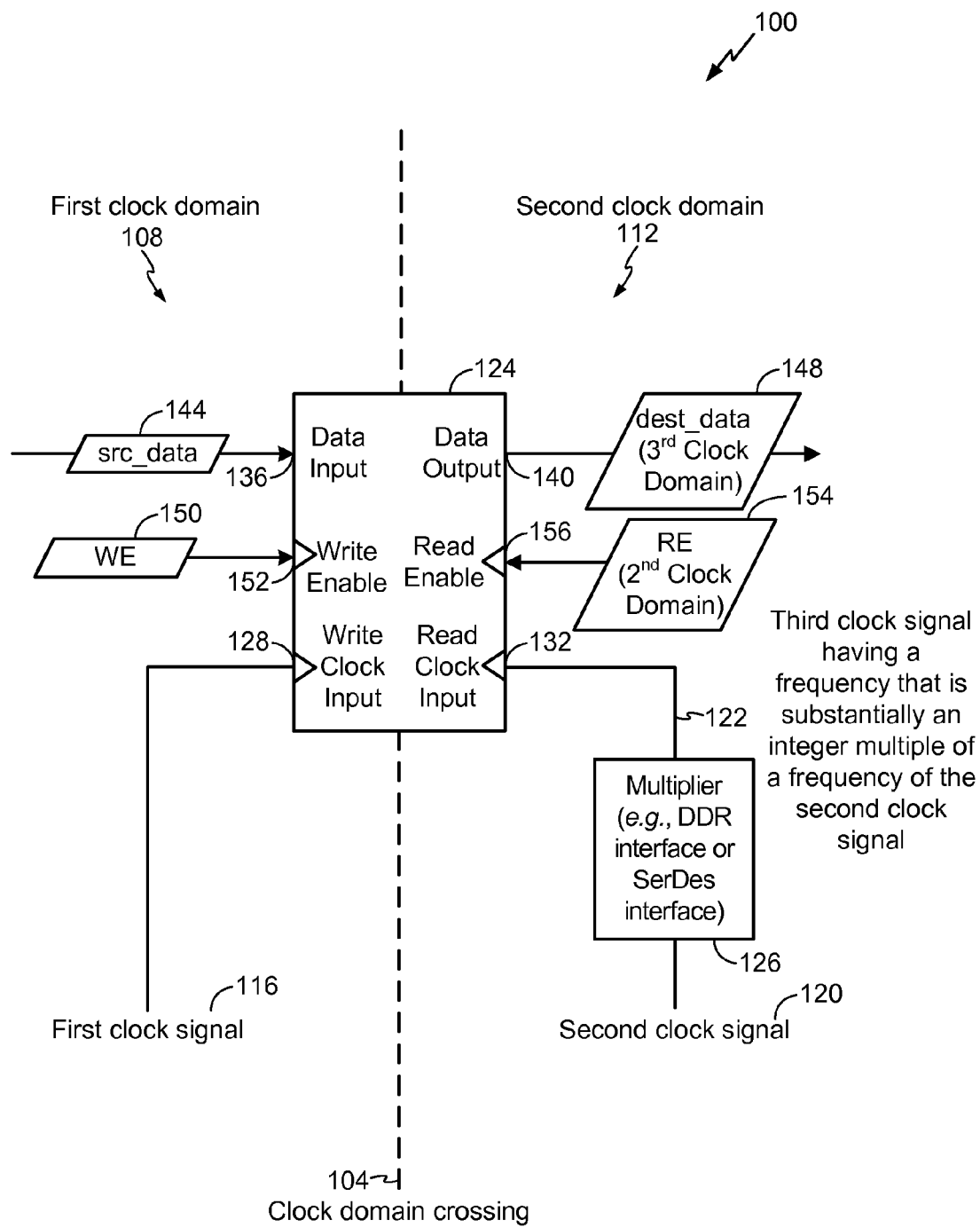
FIG. 1 is a block diagram of a particular illustrative embodiment of a system that includes a memory and a circuit to reduce a read latency of the memory.
Figure 6:
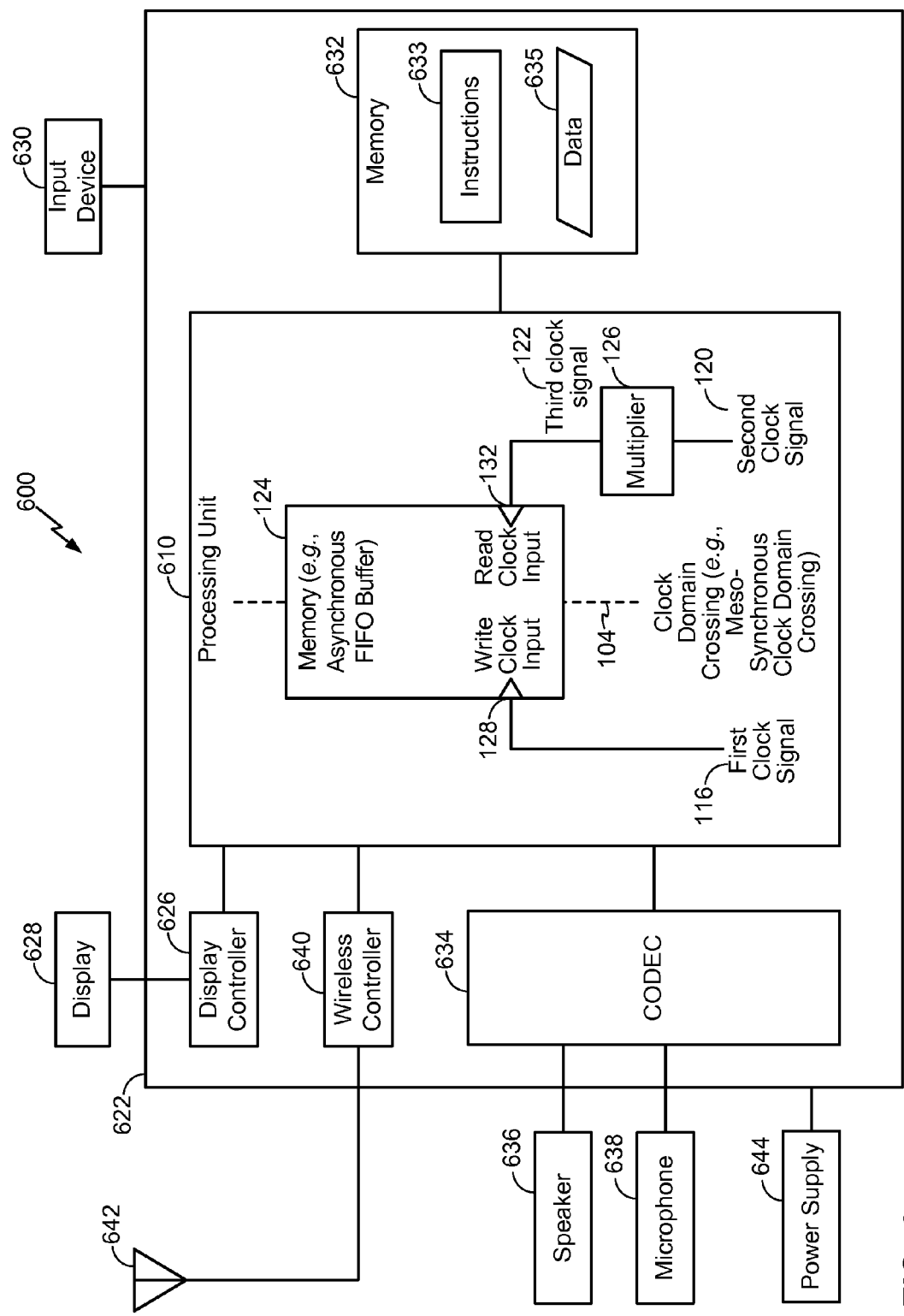
Figure 7:
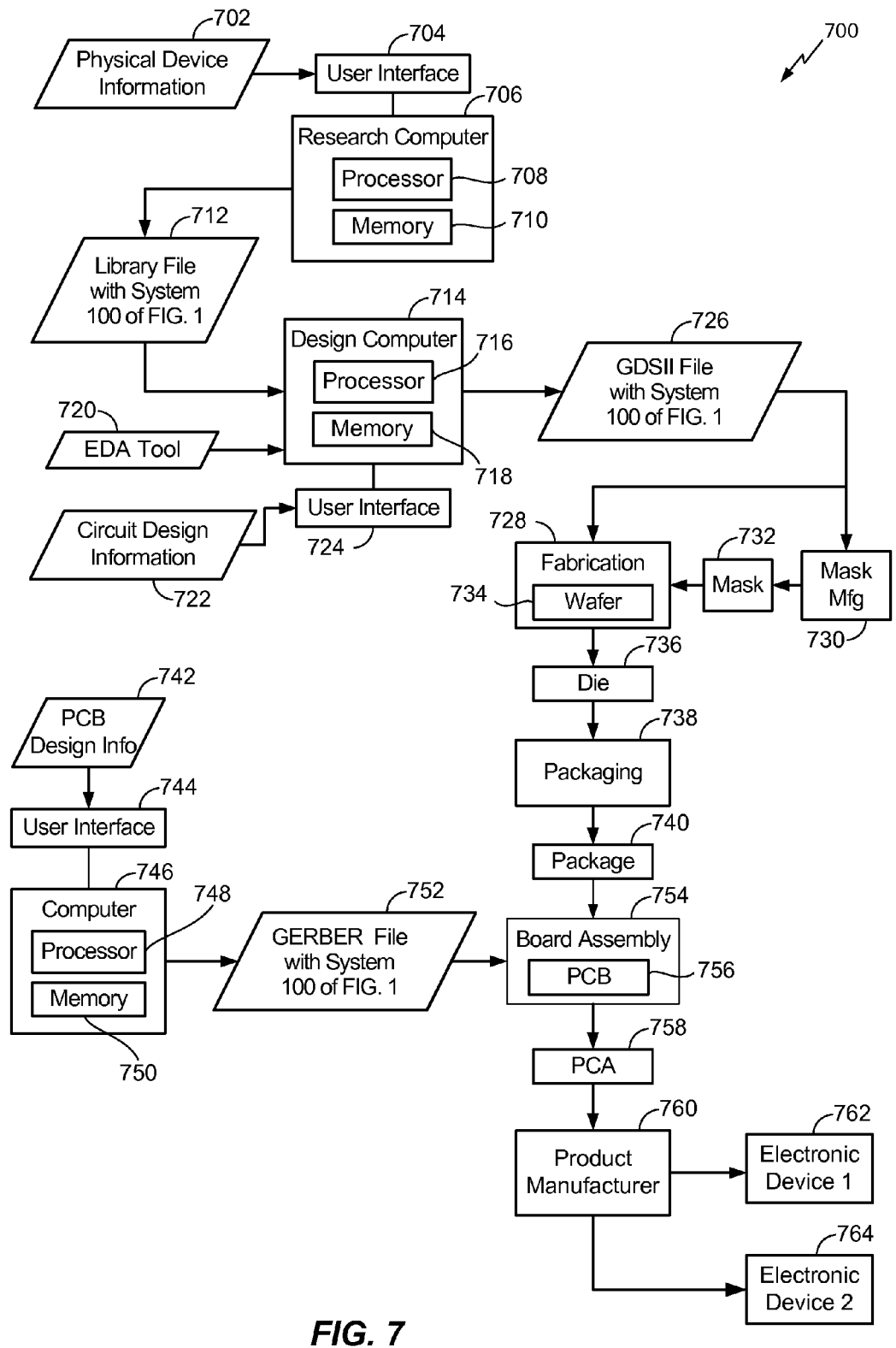

FIG. 6 is a diagram of a particular illustrative embodiment of a communication device that includes a memory, such as the memory of FIG. 1, and circuitry to reduce a read latency of the memory; and FIG. 7 is a data flow diagram of a particular illustrative embodiment of a manufacturing process to manufacture an electronic device that includes a memory, such as the memory of FIG. 1, and circuitry to reduce a read latency of the memory.

V. DETAILED DESCRIPTION

Referring to FIG. 1, a particular illustrative embodiment of a system that includes a memory and a circuit to reduce a read latency of the memory is depicted and generally designated 100. The system 100 includes a clock domain crossing 104. The clock domain crossing 104 divides a first clock domain 108 from a second clock domain 112. A first clock signal 116 may be associated with the first clock domain 108. A second clock signal 120 may be associated with the second clock domain 112.

A multiplier 126 may be responsive to the second clock signal 120. In particular, the multiplier 126 may accept the second clock signal 120 and may generate a third clock signal 122 that is substantially in phase with the second clock signal 120 and having a frequency that is substantially an integer multiple of a frequency of the second clock signal 120. According to an alternate embodiment, the multiplier 126 may generate the second clock signal 120 based on the third clock signal 122. The multiplier 126 may be included in an interface that uses a higher-rate clock signal to support data transfer. For example, the multiplier 126 may be included at a double data rate (DDR) interface or a serializer/deserializer (SerDes) interface. Further, the second clock signal 120 and the third clock signal 122 may be clock signals generated in connection with operation of the DDR interface or the SerDes interface.

The system 100 may further include a memory 124. The memory 124 may include a write clock input 128 responsive to the first clock signal 116 and a read clock input 132 responsive to the third clock signal 122. The memory 124 may also include a write enable input 152 responsive to a write enable (WE) signal 150 and a read enable input 156 responsive to a read enable (RE) signal 154. The memory 124 may further include a data input 136 configured to accept data and a data output 140 configured to output data.

In operation, the memory 124 may accept data at the data input 136. For example, the memory 124 may accept source data 144 at the data input 136 in response to receiving the write enable signal 150 at the write enable input 152 in the first clock domain 108. The source data 144 may be written at the memory 124 using a clock signal associated with the first clock domain 108. For example, the source data 144 may be written to the memory 124 based on the first clock signal 116.

After writing the source data 144 at the memory 124, a write pointer of the memory 124 may be updated to point to a next available storage location of the memory 124 at which data is to be written.

The write pointer may be transmitted to the second clock domain 112, where the write pointer is synchronized with the third clock signal 122. Synchronizing the write pointer may avoid metastability. For example, synchronizing the write pointer may reduce a likelihood that the write pointer is sampled during a bit transition of the write pointer, which might cause metastability at the system 100.

After synchronizing the write pointer at the second clock domain 112, a determination may be made that the source data 144 is available to be read from the memory 124. The source data 144 may be read from the data output 140 based on the second clock signal 120 to generate destination data 148, as described further with reference to FIG. 3. For example, the read enable signal 154 (in the second clock domain 112) may be received at the read enable input 156 and in response the destination data 148 may generated at the data output 140. Because the read clock input 132 is responsive to the third clock signal 122, the destination data 148 may be generated in a third clock domain corresponding to the third clock signal 122. Having the third clock signal 122 substantially in phase with the second clock signal 120 and at an integer multiple of a frequency of the second clock signal 120 simplifies capture of the destination data 148 (that is in the third clock domain) to the second clock domain 112. For example, clock domain transfer of the destination data 148 to the second clock domain 112 may be implemented using a simple flop device.

Because the third clock signal 122 has a frequency that is substantially an integer multiple of a frequency of the second clock signal 120, a read latency associated with synchronizing the write pointer of the memory 124 to the third clock signal 122 is reduced as compared to synchronizing the write pointer to the second clock signal 120. For example, if synchronizing the write pointer is performed in two clock cycles, then synchronizing the write pointer to the third clock signal 122 will occur in less time than synchronizing the write pointer to the second clock signal 120 because cycles of the third clock signal 122 are shorter than cycles of the second clock signal 120. Therefore, the reduced read latency may enable faster transmission of data from the first clock domain 108 to the second clock domain 112.

Figure 2:
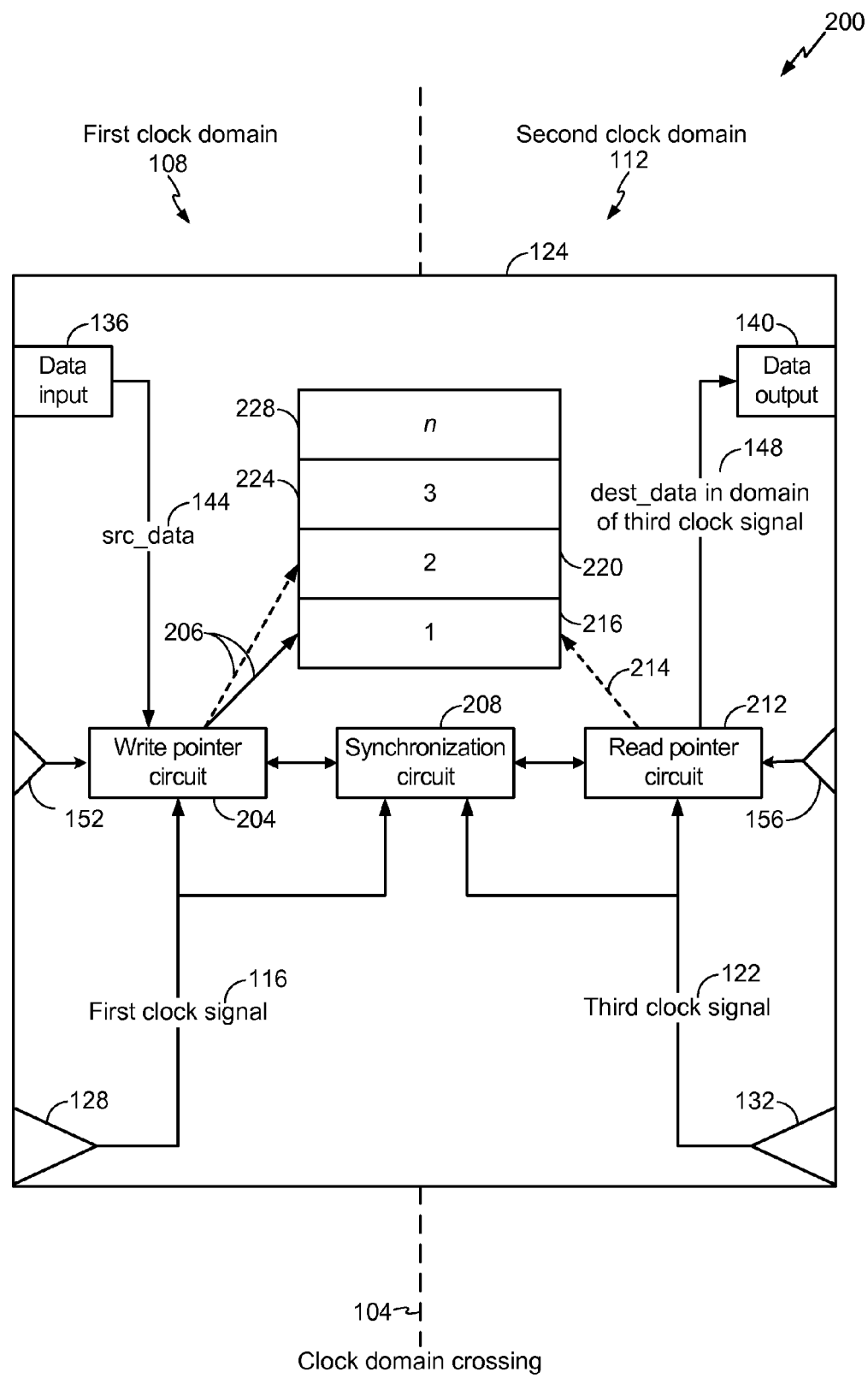
FIG. 2 is a block diagram of a particular illustrative embodiment of a memory, such as the memory of FIG. 1.

Referring to FIG. 2, a particular illustrative embodiment of system that includes a memory, such as the memory 124 of FIG. 1, is depicted and generally designated 200. The system 200 may be described with reference to other components of the system 100 of FIG. 1, such as the first clock signal 116, the second clock signal 120, the third clock signal 122, the write clock input 128, the read clock input 132, the data input 136, the data output 140, the write enable input 152, the read enable input 156, the source data 144, the destination data 148, the clock domain crossing 104, the first clock domain 108, the second clock domain 112, or a combination thereof.

The memory 124 may include multiple storage locations at which to store data, such as the source data 144. For example, FIG. 2 depicts the memory 124 including a first storage location 216, a second storage location 220, a third storage location 224, and an nth storage location 228.

The memory 124 may further include a write pointer circuit 204. The write pointer circuit 204 may include a write pointer 206 configured to indicate a next storage location of the multiple storage locations at which to write data. For example, the write pointer 206 may be a value stored at the write pointer circuit 204 that corresponds to a next storage location of the multiple storage locations of the memory 124 at which to write data. The value may be stored at one or more registers of the write pointer circuit 204, such as a counter.

The memory 124 may further include a read pointer circuit 212. The read pointer circuit 212 may include a read pointer 214 configured to point to a next storage location of the multiple storage locations of the memory 124 from which to read data. For example, the read pointer 214 may be a value stored at the read pointer circuit 212 and may correspond to a next storage location of the multiple storage locations of the memory 124 from which to read data. The value may be stored at one or more registers of the read pointer circuit 212, such as a counter.

The memory 124 may further include a synchronization circuit 208. The synchronization circuit 208 may be configured to synchronize the write pointer 206 to the third clock signal 122. The synchronization circuit 208 may also be configured to synchronize the read pointer 214 to the first clock signal 116. For example, the synchronization circuit 208 may include a first set of latching elements responsive to the third clock signal 122, and the synchronization circuit 208 may be configured to synchronize the write pointer 206 to the third clock signal 122 during two cycles of the third clock signal 122. The synchronization circuit 208 may include a second set of latching elements responsive to the first clock signal 116, and configured to synchronize the read pointer 214 to the first clock signal 116 during two cycles of the first clock signal 116.

In operation, data, such as the source data 144, may be received at the data input 136 and a write enable signal may be received at the write enable input 152. The source data 144 may be written to one of the multiple storage locations of the memory 124. For example, the source data 144 may be written to the first storage location 216.

In response to writing the source data 144 to the first storage location 216, the write pointer 206 of the write pointer circuit 204 may be updated to point to a next available storage location of the multiple storage locations of the memory 124 at which data may be written. For example, FIG. 2 depicts that the write pointer 206 is updated to point to the second storage location 220.

After writing the source data 144 to the first storage location 216 and updating the write pointer 206, the write pointer 206 may be synchronized to the third clock signal 122. Synchronizing the write pointer 206 to the third clock signal 122 may occur during two clock cycles associated with the third clock signal 122, which may ensure that the write pointer 206 is sampled properly (e.g., so that the write pointer 206 has sufficient time to be transmitted to the second clock domain 112 and to be sampled according to the third clock signal 122, reducing a likelihood of metastability).

In response to synchronizing the write pointer 206 according to the third clock signal 122, the read pointer 214 of the read pointer circuit 212 may be updated to indicate that the source data 144 has been written to the first storage location 216 and is available to be output from the memory 124. For example, FIG. 2 depicts that the read pointer 214 is updated to point to the first storage location 216, where the source data 144 has been written.

After updating the read pointer 214, the source data 144 stored at the first storage location 216 may be output from the memory 124 in response to receiving a read enable signal at the read enable input 156. For example, as described with respect to FIG. 1, although the destination data 148 may correspond to a clock domain of the third clock signal 122, the destination data 148 may be output from the data output 140 according to the second clock signal 120 responsive to receiving a read enable signal that is in the second clock domain 112.

In response to outputting the destination data 148, the read pointer 214 may be updated to indicate that data has been output from the memory 124. For example, the read pointer 214 may be incremented and may be transmitted to the synchronization circuit 208. The synchronization circuit 208 may synchronize the read pointer 214 according to the first clock signal 116.

As will be appreciated, because clock cycles of the third clock signal 122 are shorter than cycles of the second clock signal 120, a latency associated with synchronizing the write pointer 206 to the third clock signal 122 is reduced as compared to synchronizing the write pointer 206 to the second clock signal 120. As a result, data is available to be read from the memory 124 sooner, and a read latency associated with reading the data is reduced.

Figure 3:
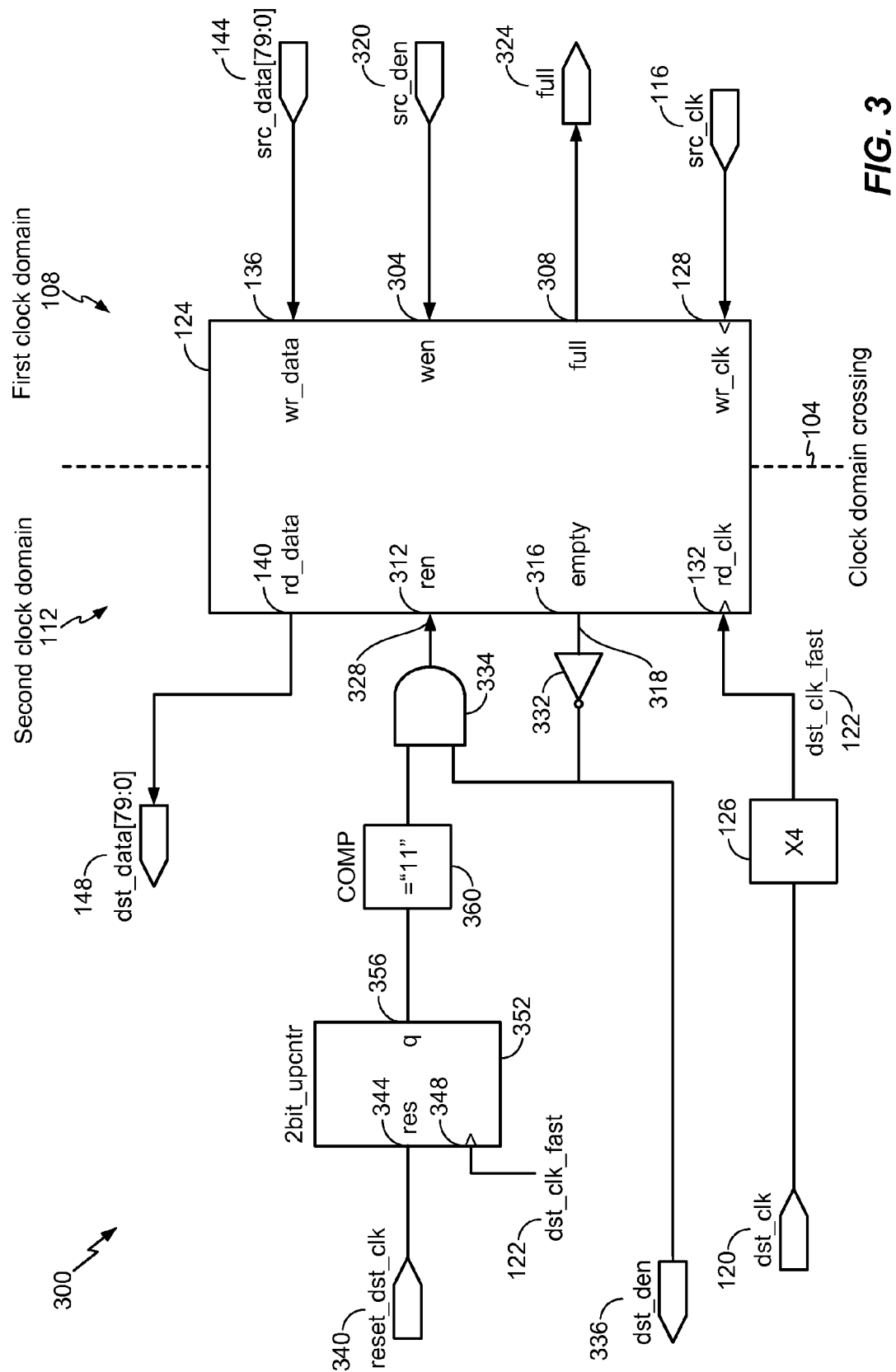
FIG. 3 is a diagram of a particular illustrative embodiment of a system that includes a memory, such as the memory of FIG. 1, and circuitry to reduce a read latency of the memory.

FIG. 3 depicts a particular illustrative embodiment of a system 300 that includes a memory, such as the memory 124 of FIG. 1, and circuitry to reduce a read latency of the memory. The system 300 may be described with reference to components of the system 100 of FIG. 1, the system 200 of FIG. 2, or a combination thereof. For example, the system 300 may include the memory 124 of FIGS. 1 and 2. The memory 124 may include the write clock input 128 that is responsive to the first clock signal 116 and may further include the read clock input 132 that is responsive to the third clock signal 122. The memory 124 may further include the data input 136 that is configured to accept the source data 144 and the data output 140 that is configured to output the destination data 148. The system 300 may further include the clock domain crossing 104, the first clock domain 108, and the second clock domain 112 of FIGS. 1 and 2. The system 300 may further include the multiplier 126 that is configured to generate the third clock signal 122 based on the second clock signal 120. For illustrative purposes, the multiplier 126 of FIG. 3 depicts an illustrative embodiment where the third clock signal is substantially in phase with the second clock signal 120 and has a frequency that is substantially four times a frequency of the second clock signal 120. However, it should be understood that the present disclosure need not be limited to the illustrative embodiment of FIG. 3.

The memory 124 may include a write enable input 304 responsive to a write enable signal 320. The memory 124 may further include a read enable input 312 that is responsive to a read enable signal 328. The memory 124 may be configured to generate an empty indicator signal 318 at an empty indicator output 316. The memory 124 may further be configured to generate a full indicator signal 324 at a full indicator output 308. According to a particular illustrative embodiment, the memory 124 is an asynchronous first-in first-out (FIFO) buffer, where data is written based on a source clock signal, such as the first clock signal 116, and data is output based on a destination clock signal, such as the second clock signal 120. The asynchronous FIFO buffer may output stored data on a "first-in first-out" basis.

The system 300 may further include a NOT gate 332 coupled to the empty indicator output 316. The NOT gate 332 may invert the empty indicator signal 318 to generate a data enable signal 336, which may be provided to an AND gate 334. The NOT gate 332 and the AND gate 334 may be logic gates formed by transistors, such as complementary metal-oxide semiconductor (CMOS) transistors.

A counter 352 may include a reset input 344, a clock input 348 responsive to the third clock signal 122, and a counter output 356. The counter 352 may be configured to receive a reset clock signal 340 at the reset input 344. When asserted, the reset clock signal 340 may reset operation of the counter 352.

The system 300 may further include a comparator 360 coupled to the counter 352. The comparator 360 may further be coupled to the AND gate 334.

In operation, the memory 124 may receive the source data 144 at the data input 136. If the write enable signal 320 is asserted and the full indicator signal 324 is not asserted, then the source data 144 may be written to the memory 124. For example, the source data 144 may be written to the memory 124 according to the first clock signal 116. As described with reference to FIG. 2, a write pointer, such as the write pointer 206 of FIG. 2, may be updated in response to writing the source data 144 to the memory 124. For example, the write pointer may be incremented to point to a next available storage entry of the memory 124 at which data may be stored.

After updating the write pointer, the write pointer may be synchronized to a different clock signal than was used to write the source data 144 to the memory 124. For example, the write pointer may be synchronized to the third clock signal 122. The third clock signal may have a frequency that is greater than a clock signal that is used to read data from the memory 124 (e.g., the second clock signal 120). Synchronizing the write pointer may include holding the write pointer in a first latching element during a first clock cycle of the third clock signal 122 and holding the write pointer in a second latching element during a second clock cycle of the third clock signal 122.

After synchronizing the write pointer, the memory 124 may determine if data is available to be output from the memory 124. To determine whether data is available to be output, the data enable signal 336 generated by the NOT gate 332 may be referenced. To illustrate, if the data enable signal 336 is asserted (i.e., the empty indicator signal 318 is not asserted), then a determination may be made that data is available to be read from the memory 124.

To read the data from the memory 124 according to the second clock signal 120, the counter 352 may count cycles of the third clock signal 122. The counter 352 may output a value via the counter output 356. In the embodiment depicted in FIG. 3, the counter 352 is a two bit counter configured to count four values (e.g., "00," "01," "10," and "11").

The comparator 360 may receive the value via the counter output 356. When the value matches the integer multiple associated with the third clock signal 122 (e.g., "11" as depicted in the embodiment of FIG. 3), the comparator may output a signal to the AND gate 334. By generating the signal when the value matches the integer multiple associated with the third clock signal 122, the read enable signal 328 may be asserted based on a frequency of the second clock signal 120.

The AND gate 334 may receive the signal from the counter 360. The AND gate 334 may further receive the data enable signal 336 generated by the NOT gate 332 (e.g., an indication that the memory 124 has stored data to be read). When both the signal from the comparator 360 and the data enable signal 336 from the NOT gate 332 are asserted, the AND gate 334 may generate the read enable signal 328. The read enable signal 328 may be provided to the read enable input 312 of the memory 124.

In response to receiving the read enable signal 328 at the read enable input 312, the memory 124 may output the source data 144. For example, the memory 124 may output the destination data 148 at the data output 140. The memory 124 may output the destination data 148 at a time determined according to the second clock signal 120 (e.g., as depicted in the embodiment of FIG. 3, at one-fourth the frequency of the third clock signal 122), since the read enable signal 328 is asserted based on a frequency of the second clock signal 120. Accordingly, FIG. 3 depicts reading data from the memory 124 according to the second clock signal 120. Reading the data from the memory 124 may include generating a read enable signal (such as the read enable signal 328) that matches the second clock signal 120 gated by the empty indicator signal 318.

As will be appreciated, using a higher-frequency clock signal to synchronize a write pointer may reduce a read latency associated with reading data from the memory 124. For example, because clock cycles of the higher-frequency clock signal are shorter in duration than clock cycles of the clock signal that is used to read the data, less time is spent synchronizing the write pointer to the higher-frequency clock signal. As a result, the write pointer is synchronized more quickly, and the data is available sooner to be read from the memory 124.

It should further be appreciated that although the described embodiments of FIGS. 1-3 apply a higher-frequency clock to the read clock input 132 of the memory 124, in other embodiments a higher-frequency clock may be applied to the write clock input 128 of the memory 124 to increase a speed of synchronizing a read pointer, such as the read pointer 214 of FIG. 2. To illustrate, a memory, such as the memory 124, may be designed to trigger a full indicator, such as the full indicator signal 324, pessimistically—that is, based on an assumption that no data is being read during synchronization of the read pointer to ensure data is not overwritten. As a result, the full indicator may be triggered when the memory is not actually full, decreasing a throughput of the memory. By synchronizing the read pointer to a higher-rate write clock, synchronization may be achieved faster and the full indicator may be triggered less pessimistically. As a result, by providing a higher-frequency clock to the read clock input 132 of the memory 124, the full indicator signal 324 may be triggered less often or less "pessimistically," enabling a higher write throughput of the memory 124.

Further, although FIGS. 1 and 3 depict that the multiplier 126 generates the third clock signal 122, according to other embodiments, the third clock signal 122 is provided by an interface, such as a double data rate (DDR) interface or a serializer/deserializer (SerDes) interface that uses a higher-frequency clock signal to support data transfer.

Figure 4:
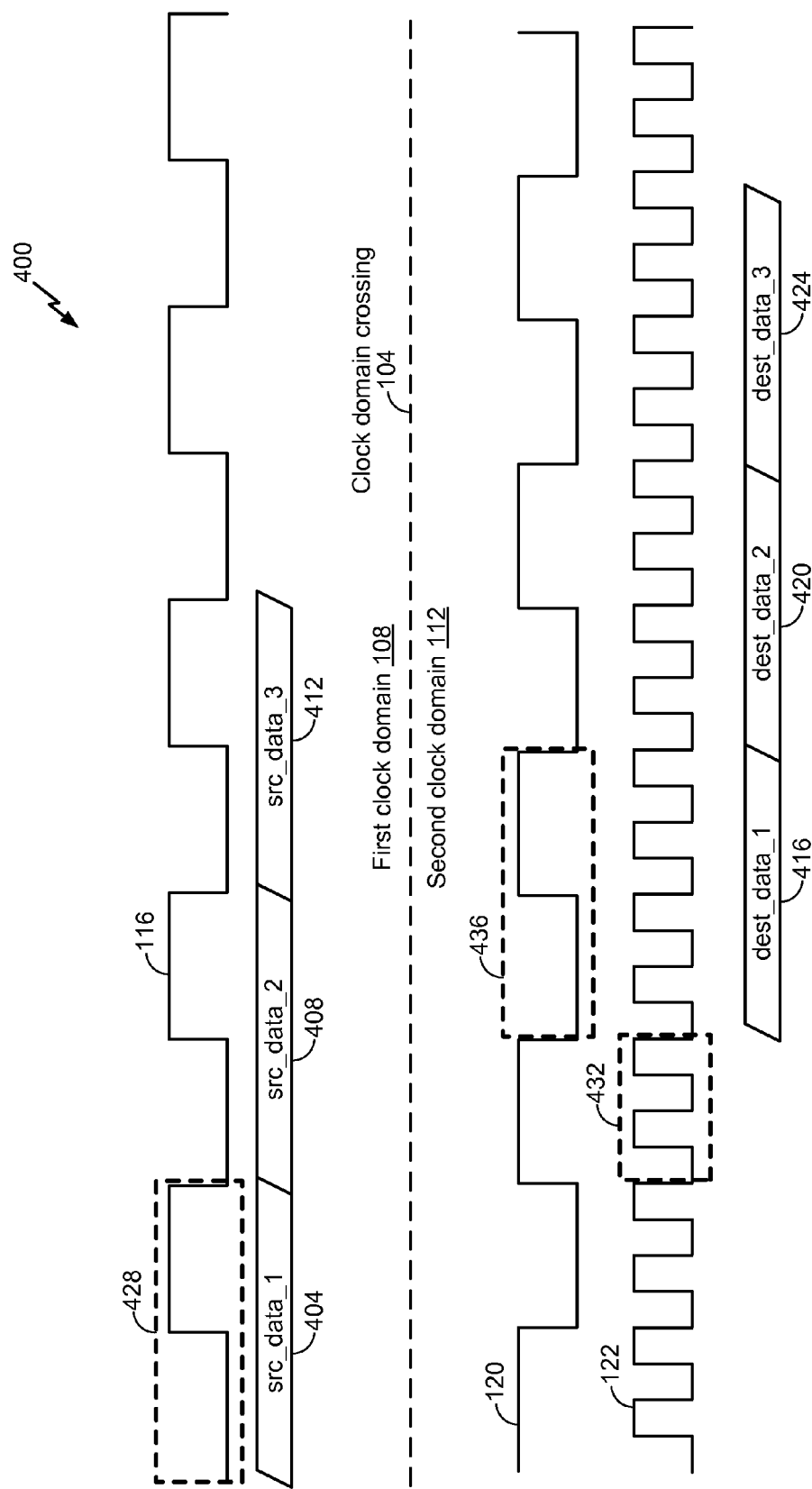
FIG. 4 is a timing diagram that illustrates operation of a memory, such as the memory of FIG. 1.

Referring to FIG. 4, a timing diagram that illustrates operation of a memory and circuitry to reduce a read latency of the memory is depicted and generally designated 400. The timing diagram 400 may describe operation of the system 100 of FIG. 1, the system 200 of FIG. 2, the system 300 of FIG. 3, or a combination thereof.

The timing diagram 400 may be described with reference to various features of FIGS. 1-3. For example, the timing diagram 400 may be described with reference to the clock domain crossing 104, the first clock domain 108, the second clock domain 112, the first clock signal 116, the second clock signal 120, and the third clock signal 122 of FIGS. 1-3. For illustrative purposes, FIG. 4 further depicts first source data 404, second source data 408, third source data 412, first destination data 416, second destination data 420, and third destination data 424.

FIG. 4 depicts that the third clock signal 122 is substantially in phase with the second clock signal 120. A frequency of the third clock signal 122 is substantially an integer multiple of a frequency of the second clock signal 120, where the integer multiple is greater than one. To illustrate, FIG. 4 depicts that the frequency of the third clock signal 122 is substantially four times the frequency of the second clock signal 120.

As described with reference to FIGS. 1-3, the third clock signal 122 may be used to synchronize a write pointer, such as the write pointer 206 of FIG. 2, to a clock domain, such as the second clock domain 112. As depicted in FIG. 4, a latency between writing data (e.g., the first source data 404) and reading the data (e.g., the first destination data 416) may be of a duration of four clock cycles or more—for example, one cycle to write the data, two cycles to synchronize pointers, and one cycle to read the data. For example, FIG. 4 depicts that the first source data 404 is written during a first cycle 428 of the first clock signal, a write pointer is synchronized during second and third cycles 432 of the third clock signal 122, and the first destination data is output during a fourth cycle 436 of the second clock 120. Similarly, the second source data 408 may be read, synchronized, and output over four cycles as the second destination data 420. Further, the third source data 412 may be read, synchronized, and output over four cycles as the third destination data 424.

According to an alternate embodiment, the third clock signal 122 is provided to a write clock input, such as the write clock input 128 of FIGS. 1-3. Providing the third clock signal 122 to the write clock input 128 may increase system throughput, as previously described with reference to FIG. 3.

As will be appreciated, a memory operating according to the timing diagram 400 of FIG. 4 may operate with a reduced read latency. For example, because data is synchronized according to the third clock signal 122 instead of according to the second clock signal 120, data is available to be output from the memory faster as compared to synchronizing the data according to the second clock signal 120, since cycles of the third clock signal 122 are shorter than cycles of the second clock signal 120.

Figure 5:
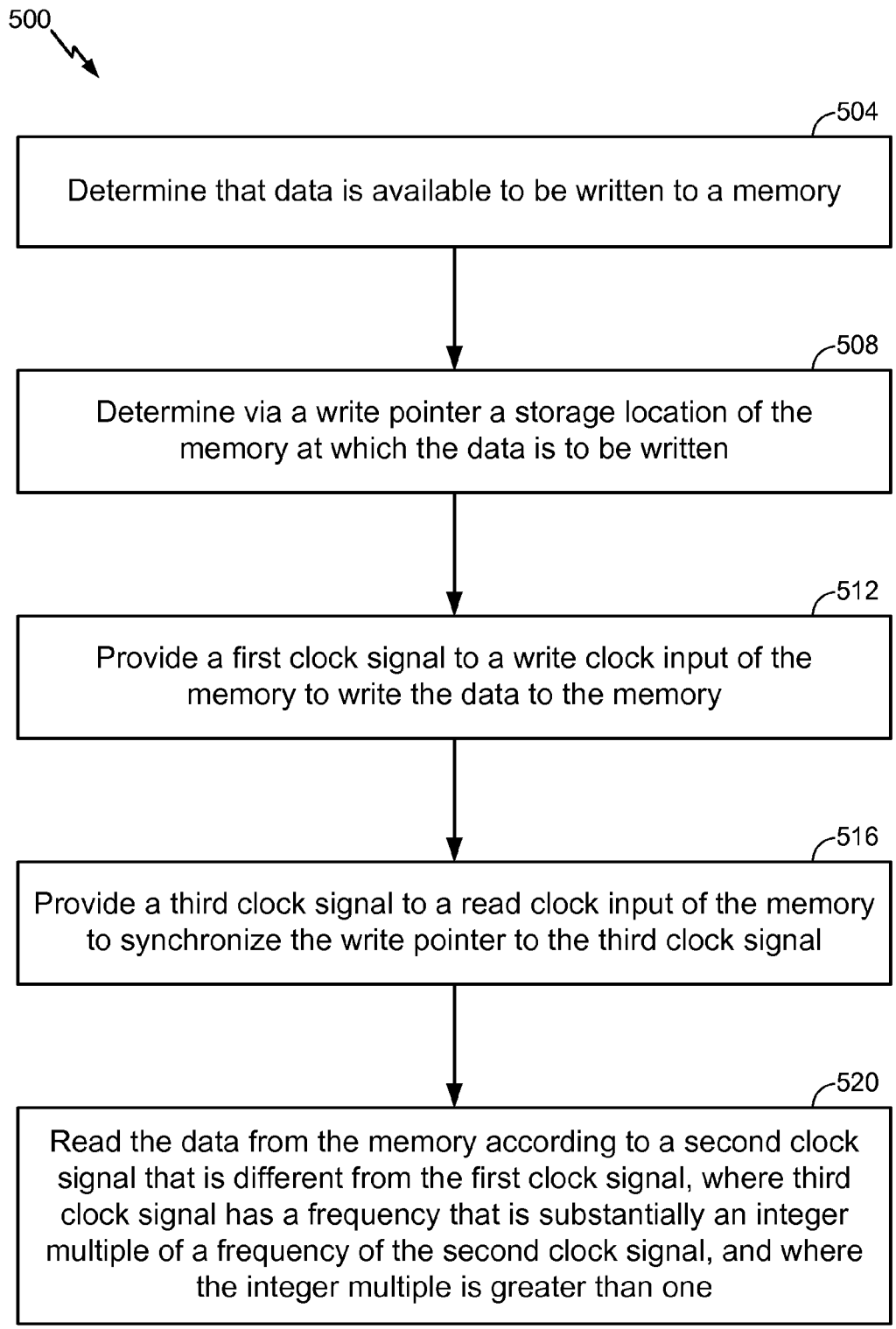
FIG. 5 is a flow diagram of a particular illustrative embodiment of a method of operation of a memory and circuitry to reduce a read latency of the memory, such as the memory of FIG. 1.

Referring to FIG. 5, a flow diagram of a particular illustrative embodiment of a method of operation of a memory and circuitry to reduce a read latency of the memory is depicted and generally designated 500. The method 500 may be performed at the system 100 of FIG. 1, the system 200 of FIG. 2, the system 300 of FIG. 3, or a combination thereof. In addition, the method 500 may be performed in accordance with the timing diagram 400 of FIG. 4.

The method 500 may include determining that data is available to be written to a memory, at 504. The memory may be the memory 124 of FIGS. 1-3. The data may be the source data 144 of FIGS. 1-3 or the first source data 404, the second source data 408, or the third source data 412 of FIG. 4.

The method 500 may further include determining via a write pointer a storage location of the memory at which the data is to be written, at 508. The write pointer may be the write pointer 206 of FIG. 2. The storage location may be the first storage location 216, the second storage location 220, the third storage location 224, or the nth storage location 228 of FIG. 2.

The method 500 may further include providing a first clock signal to a write clock input of the memory to write the data to the memory, at 512. The first clock signal may be the first clock signal 116 of FIGS. 1-4. The write clock input may be the write clock input 128 of FIGS. 1-3.

The method 500 may further include providing a third clock signal to a read clock input of the memory to synchronize the write pointer to the third clock signal, at 516. The third clock signal may be the third clock signal 122 of FIGS. 1-4. The read clock input may be the read clock input 132 of FIGS. 1-3.

The method 500 may further include reading the data from the memory according to a second clock signal that is different from the first clock signal, where third clock signal has a frequency that is substantially an integer multiple of a frequency of the second clock signal, and where the integer multiple is greater than one, at 520. For example, reading the data from the memory according to the second clock signal may include reading the data at a rate that corresponds to the frequency of the second clock signal. The second clock signal may be the second clock signal 120 of FIGS. 1-4. According to a particular illustrative embodiment, the integer multiple is four, as described with reference to FIGS. 3 and 4.

Referring to FIG. 6, a particular illustrative embodiment of a communication device that includes a memory and circuitry to reduce a read latency of the memory is depicted and generally designated 600. The communication device 600 may include components described with reference to FIGS. 1-3, may operate according to the timing diagram 400 of FIG. 4, may perform the method 500 of FIG. 5, or a combination thereof.

The communication device 600 may include a processing unit, such as a processing unit 610. The processing unit 610 may include components described with reference to FIGS. 1-3, such as the memory 124 of FIGS. 1-3. According to a particular illustrative embodiment, the memory 124 is an asynchronous first-in first-out (FIFO) buffer. The memory 124 may include the write clock input 128 that is responsive to the first clock signal 116 and the read clock input 132 responsive to the third clock signal 122 having a frequency that is substantially an integer multiple of a frequency of the second clock signal 120, as described with reference to FIGS. 1-3. The processing unit 610 may further include the multiplier 126 of FIGS. 1-3 configured to generate the third clock signal 122 based on the second clock signal 120. The processing unit 610 may include the clock domain crossing 104 of FIGS. 1-3, such as a meso-synchronous clock domain crossing.

A memory 632 may be coupled to the processing unit 610. The memory 632 may be a tangible (e.g., non-transitory) computer-readable (e.g., processor-readable) storage medium and may store instructions 633 and data 635.

A display controller 626 may be coupled to the processing unit 610 and to a display 628. A coder/decoder (CODEC) 634 may also be coupled to the processing unit 610. A speaker 636 and a microphone 638 may be coupled to the CODEC 634.

A wireless controller 640 may be coupled to the processing unit 610 and to a wireless antenna 642. In a particular embodiment, the processing unit 610, the display controller 626, the memory 632, the CODEC 634, and the wireless controller 640 are included in a system-in-package or system-on-chip device 622. In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the wireless antenna 642, and the power supply 644 are external to the system-on-chip device 622. However, each of the display 628, the input device 630, the speaker 636, the microphone 638, the wireless antenna 642, and the power supply 644 can be coupled to a component of the system-on-chip device 622, such as an interface or a controller.

FIG. 6 depicts that the processing unit 610 includes a memory and circuitry to reduce a read latency of the memory (e.g., the memory 124 and the multiplier 136). However, various other components of FIG. 6 may include a memory and circuitry to reduce a read latency of the memory. For example, a memory and circuitry to reduce a read latency of the memory (e.g., the system 100 of FIG. 1, the system 200 of FIG. 2, or the system 300 of FIG. 3) may be utilized or disposed within any component of the communication device 600 or another electronic device that includes a memory to transfer data over a clock domain crossing.

As used herein, "substantially an integer multiple of" may refer to a relation between clock signals, such as the second clock signal 120 and the third clock signal 122. To illustrate, if the second clock signal 120 has a frequency of 250 megahertz (MHz) and the third clock signal 122 has a frequency of 1 gigahertz (GHz), then the third clock signal 122 has a frequency that is substantially an integer multiple of four of a frequency of the second clock signal 120. As another example, if the second clock signal 120 has a frequency of 250 MHz and the third clock signal 122 has a frequency of 999 MHz, then the third clock signal 122 has a frequency that is substantially an integer multiple of four of a frequency of the second clock signal 120. The third clock signal 122 is also an integer multiple of the second clock signal 120 if a phase of the third clock signal 122 is substantially aligned with a phase of the third clock signal 120. As will be appreciated by one of skill in the art, the phase of the third clock signal 122 need not be exactly aligned with the phase of the second clock signal 120, so long as the phases are sufficiently aligned to prevent excessive jitter resulting from the third clock signal 122 being out of phase with respect to the second clock signal 120. Jitter is generally a design criterion to be considered with respect to a particular circuit design or application. A particular tolerance for jitter may depend on the particular circuit to be implemented, design criteria, and other considerations relevant to a particular application.

In conjunction with the described embodiments, an apparatus is disclosed that includes means for storing (e.g., the write pointer circuit 204 of FIG. 2) a write pointer value (e.g., the write pointer 206 of FIG. 2) that indicates a storage location (e.g., the first storage location 216, the second storage location 220, the third storage location 224, or the nth storage location 228 of FIG. 2) of a memory (e.g., the memory 124 of FIGS. 1-3 and 6) at which to write data (e.g., the source data 144 of FIGS. 1-3 or the first source data 404, the second source data 408, or the third source data 412 of FIG. 4). The apparatus further includes means for synchronizing (e.g., the synchronization circuit 208 of FIG. 2) the write pointer value based on a first signal (e.g., the third clock signal 122 of FIGS. 1-4 and 6), where the first signal has a frequency that is substantially an integer multiple of a frequency of a second signal (e.g., the second clock signal 120 of FIGS. 1-4 and 6) at which the data is read from the memory, and where the integer multiple is greater than one. The apparatus may further include means for storing (e.g., the read pointer circuit 212 of FIG. 2) a read pointer value (e.g., the read pointer 214 of FIG. 2) that indicates a storage location (e.g., the first storage location 216, the second storage location 220, the third storage location 224, or the nth storage location 228 of FIG. 2) of the memory from which to read the data.

The foregoing disclosed devices and functionalities may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

Referring to FIG. 7, a particular illustrative embodiment of a manufacturing process to manufacture an electronic device that includes a memory and circuitry to reduce a read latency of the memory is depicted and generally designated 700. Physical device information 702 is received at the manufacturing process 700, such as at a research computer 706. The physical device information 702 may include design information representing at least one physical property of a semiconductor device, such as the system 100 of FIG. 1, the system 200 of FIG. 2, the system 300 of FIG. 3, or a combination thereof. For example, the physical device information 702 may include physical parameters, material characteristics, and structure information that is entered via a user interface 704 coupled to the research computer 706. The research computer 706 includes a processor 708, such as one or more processing cores, coupled to a tangible computer readable medium such as a memory 710. The memory 710 may store computer readable instructions that are executable to cause the processor 708 to transform the physical device information 702 to comply with a file format and to generate a library file 712.

In a particular embodiment, the library file 712 includes at least one data file including the transformed design information. Although FIG. 7 depicts that the library file 712 includes a data file including the system 100 of FIG. 1, the library file 712 may alternatively or in addition include a library of semiconductor devices that include the system 200 of FIG. 2, the system 300 of FIG. 3, one or more components of the communication device 600 of FIG. 6, or a combination thereof.

The library file 712 may be provided for use with an electronic design automation (EDA) tool 720 and used in conjunction with the EDA tool 720 at a design computer 714 including a processor 716, such as one or more processing cores, coupled to a memory 718. The EDA tool 720 may be stored as processor executable instructions at the memory 718 to enable a user of the design computer 714 to design the system 100 of FIG. 1, the system 200 of FIG. 2, the system 300 of FIG. 3, one or more components of the communication device 600 of FIG. 6, or a combination thereof, of the library file 712. For example, a user of the design computer 714 may enter circuit design information 722 via a user interface 724 coupled to the design computer 714. The circuit design information 722 may include design information representing at least one physical property of a semiconductor device, such as the system 100 of FIG. 1, the system 200 of FIG. 2, the system 300 of FIG. 3, one or more components of the communication device 600 of FIG. 6, or a combination thereof. To illustrate, the circuit design property may include identification of particular circuits and relationships to other elements in a circuit design, positioning information, feature size information, interconnection information, or other information representing a physical property of a semiconductor device.

The design computer 714 may be configured to transform the design information, including the circuit design information 722, to comply with a file format. To illustrate, the file formation may include a database binary file format representing planar geometric shapes, text labels, and other information about a circuit layout in a hierarchical format, such as a Graphic Data System (GDSII) file format. The design computer 714 may be configured to generate a data file including the transformed design information, such as a GDSII file 726 that includes information describing the system 100 of FIG. 1, as depicted in FIG. 7. However, alternatively or in addition, the GDSII file 726 may include information describing the system 200 of FIG. 2, the system 300 of FIG. 3, one or more components of the communication device 600 of FIG. 6, or a combination thereof, in addition to other circuits or information. To illustrate, the data file may include information corresponding to a system-on-chip (SOC) that includes the system 100 of FIG. 1, the system 200 of FIG. 2, the system 300 of FIG. 3, one or more components of the communication device 600 of FIG. 6, or a combination thereof, and that also includes additional electronic circuits and components within the SOC.

The GDSII file 726 may be received at a fabrication process 728 to manufacture the system 100 of FIG. 1, the system 200 of FIG. 2, the system 300 of FIG. 3, one or more components of the communication device 600 of FIG. 6, or a combination thereof, according to transformed information in the GDSII file 726. For example, a device manufacture process may include providing the GDSII file 726 to a mask manufacturer 730 to create one or more masks, such as masks to be used with photolithography processing, illustrated as a representative mask 732. The mask 732 may be used during the fabrication process to generate one or more wafers 734, which may be tested and separated into dies, such as a representative die 736. The die 736 may include any of the system 100 of FIG. 1, the system 200 of FIG. 2, the system 300 of FIG. 3, one or more components of the communication device 600 of FIG. 6, or a combination thereof.

The die 736 may be provided to a packaging process 738 where the die 736 is incorporated into a representative package 740. For example, the package 740 may include the single die 736 or multiple dies, such as a system-in-package (SiP) arrangement. The package 740 may be configured to conform to one or more standards or specifications, such as Joint Electron Device Engineering Council (JEDEC) standards.

Information regarding the package 740 may be distributed to various product designers, such as via a component library stored at a computer 746. The computer 746 may include a processor 748, such as one or more processing cores, coupled to a memory 750. A printed circuit board (PCB) tool may be stored as processor executable instructions at the memory 750 to process PCB design information 742 received from a user of the computer 746 via a user interface 744. The PCB design information 742 may include physical positioning information of a packaged semiconductor device on a circuit board, the packaged semiconductor device corresponding to the package 740 including the system 100 of FIG. 1, the system 200 of FIG. 2, the system 300 of FIG. 3, one or more components of the communication device 600 of FIG. 6, or a combination thereof.

The computer 746 may be configured to transform the PCB design information 742 to generate a data file, such as a GERBER file 752 with data that includes physical positioning information of a packaged semiconductor device on a circuit board, as well as layout of electrical connections such as traces and vias, where the packaged semiconductor device corresponds to the package 740 including the system 100 of FIG. 1, the system 200 of FIG. 2, the system 300 of FIG. 3, one or more components of the communication device 600 of FIG. 6, or a combination thereof. In other embodiments, the data file generated by the transformed PCB design information may have a format other than a GERBER format.

The GERBER file 752 may be received at a board assembly process 754 and used to create PCBs, such as a representative PCB 756, manufactured in accordance with the design information stored within the GERBER file 752. For example, the GERBER file 752 may be uploaded to one or more machines to perform various steps of a PCB production process. The PCB 756 may be populated with electronic components including the package 740 to form a representative printed circuit assembly (PCA) 758.

The PCA 758 may be received at a product manufacture process 760 and integrated into one or more electronic devices, such as a first representative electronic device 762 and a second representative electronic device 764. As an illustrative, non-limiting example, the first representative electronic device 762, the second representative electronic device 764, or both, may be selected from the group of a set top box, a music player, a video player, an entertainment unit, a navigation device, a communications device, a personal digital assistant (PDA), a fixed location data unit, and a computer, into which the system 100 of FIG. 1, the system 200 of FIG. 2, the system 300 of FIG. 3, one or more components of the communication device 600 of FIG. 6, or a combination thereof, is integrated. As another illustrative, non-limiting example, one or more of the electronic devices 762 and 764 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 7 illustrates remote units according to teachings of the disclosure, the disclosure is not limited to these illustrated units. Embodiments of the disclosure may be suitably employed in any device which includes active integrated circuitry including memory and on-chip circuitry.

A device that includes the system 100 of FIG. 1, the system 200 of FIG. 2, the system 300 of FIG. 3, one or more components of the communication device 600 of FIG. 6, or a combination thereof may be fabricated, processed, and incorporated into an electronic device, as described in the illustrative process 700. One or more aspects of the embodiments disclosed with respect to FIGS. 1-7 may be included at various processing stages, such as within the library file 712, the GDSII file 726, and the GERBER file 752, as well as stored at the memory 710 of the research computer 706, the memory 718 of the design computer 714, the memory 750 of the computer 746, the memory of one or more other computers or processors (not shown) used at the various stages, such as at the board assembly process 754, and also incorporated into one or more other physical embodiments such as the mask 732, the die 736, the package 740, the PCA 758, other products such as prototype circuits or devices (not shown), or any combination thereof. Although various representative stages of production from a physical device design to a final product are depicted, in other embodiments fewer stages may be used or additional stages may be included. Similarly, the process 700 may be performed by a single entity or by one or more entities performing various stages of the process 700.

Those of skill would further appreciate that the various illustrative logical blocks, configurations, modules, circuits, and steps described in connection with the embodiments disclosed herein may be implemented as electronic hardware, instructions executed by a processor, or combinations of both. Various illustrative components, blocks, configurations, modules, circuits, and steps have been described above generally in terms of their functionality. Whether such functionality is implemented as hardware or processor-executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or process described in connection with the embodiments disclosed herein may be embodied directly in hardware, in instructions executable by a processor, or in a combination of the two. Processor-executable instructions may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
providing a first clock signal to a write clock input of a memory to write data to the memory; and
reading the data from the memory according to a second clock signal that is different from the first clock signal, wherein a third clock signal is provided to a read clock input of the memory, the third clock signal having a frequency that is substantially an integer multiple of a frequency of the second clock signal, and wherein the integer multiple is greater than one.

2. The method of claim 1, wherein the memory is an asynchronous buffer that comprises a write pointer and a read pointer, and wherein a read latency is associated with synchronizing the write pointer to the third clock signal instead of synchronizing the write pointer to the second clock signal.

3. The method of claim 1, wherein the data is written to the memory from a first clock domain corresponding to the first clock signal and wherein the data is read from the memory in a second clock domain corresponding to the second clock signal.

4. The method of claim 3, wherein the second clock signal and the third clock signal are associated with a double data rate (DDR) interface or a serializer/deserializer (SerDes) interface.

5. The method of claim 1, wherein reading the data according to the second clock signal includes generating a read enable signal, wherein the read enable signal matches the second clock signal gated by a empty indicator signal.

6. The method of claim 5, wherein the read enable signal is generated based on a signal generated by a comparator, the comparator responsive to a counter configured to count cycles of the third clock signal.

7. The method of claim 1, wherein reading the data from the memory according to the second clock signal includes reading the data at a rate that corresponds to the frequency of the second clock signal.

8. A device comprising:
a write clock input responsive to a first clock signal;
a data output configured to output data according to a second clock signal that is different from the first clock signal; and
a read clock input responsive to a third clock signal, the third clock signal having a frequency that is substantially an integer multiple of a frequency of the second clock signal, wherein the integer multiple is greater than one.

9. The device of claim 8, further comprising:
a write pointer circuit configured to store a write pointer value that indicates a storage location at which to write the data; and
a synchronization circuit configured to synchronize the write pointer value based on the third clock signal.

10. The device of claim 9, further comprising a read pointer circuit configured to store a read pointer value indicating a next storage location to be read.

11. The device of claim 10, wherein the synchronization circuit is further configured to synchronize the read pointer value based on the first clock signal.

12. The device of claim 11, further comprising a read enable input responsive to a read enable signal.

13. The device of claim 12, further comprising an empty indicator output configured to generate an empty indicator signal that indicates whether the data is available to be read.

14. The device of claim 8, integrated in at least one semiconductor die.

15. The device of claim 8, further comprising at least one of: a set top box, a music player, a video player, an entertainment unit, a navigation device, a communications device, a personal digital assistant (PDA), a fixed location data unit, or a computer, into which the device is integrated.

16. An apparatus comprising:
means for receiving a first clock signal;
means for transmitting data according to a second clock signal that is different from the first clock signal; and
means for receiving a third clock signal, the third clock signal having a frequency that is substantially an integer multiple of a frequency of the second clock signal, wherein the integer multiple is greater than one.

17. The apparatus of claim 16, further comprising means for storing a read pointer value that indicates a storage location from which to read the data.

18. The apparatus of claim 16, integrated in at least one semiconductor die.

19. The apparatus of claim 16, further comprising at least one of: a set top box, a music player, a video player, an entertainment unit, a navigation device, a communications device, a personal digital assistant (PDA), a fixed location data unit, or a computer, into which the means for receiving the first clock signal, the means for transmitting data, and the means for receiving the third clock signal are integrated.

20. A method comprising:
a step for providing a first clock signal to a write clock input of a memory to write data to the memory; and
a step for outputting the data from the memory according to a second clock signal that is different from the first clock signal,
wherein a third clock signal is provided to a read clock input of the memory, the third clock signal having a frequency that is substantially an integer multiple of a frequency of the second clock signal, wherein the integer multiple is greater than one.

21. The method of claim 20, further comprising a step for synchronizing a write pointer of the memory and a read pointer of the memory according to the third clock signal.

22. The method of claim 21, wherein the step for providing the first clock signal and the step for reading the data are performed at a processor integrated into an electronic device.

23. A method comprising:
receiving design information representing at least one physical property of a semiconductor device, the semiconductor device comprising:
a memory comprising:
a write clock input responsive to a first clock signal;
a data output configured to output data according to a second clock signal that is different from the first clock signal; and
a read clock input responsive to a third clock signal, the third clock signal having a frequency that is substantially an integer multiple of a frequency of the second clock signal, wherein the integer multiple is greater than one;
transforming the design information to comply with a file format; and
generating a data file including the transformed design information.

24. The method of claim 23, wherein the data file includes a GDSII format.

25. A method comprising:
receiving a data file comprising design information comprising physical positioning information of a packaged semiconductor device on a circuit board; and
manufacturing the circuit board configured to receive the packaged semiconductor device according to the design information, wherein the packaged semiconductor device comprises:
- a memory comprising:
  - a write clock input responsive to a first clock signal;
  - a data output configured to output data according to a second clock signal that is different from the first clock signal; and
  - a read clock input responsive to a third clock signal, the third clock signal having a frequency that is substantially an integer multiple of a frequency of the second clock signal, wherein the integer multiple is greater than one.

26. The method of claim 25, wherein the data file has a GERBER format.

27. The method of claim 25, further comprising integrating the circuit board into at least one of: a set top box, a music player, a video player, an entertainment unit, a navigation device, a communications device, a personal digital assistant (PDA), a fixed location data unit, or a computer.

* * * * *